Aug. 31, 1943.   R. M. SHAW, JR   2,328,301
WHEEL THEFT PREVENTION MEANS
Filed April 21, 1942   2 Sheets-Sheet 1
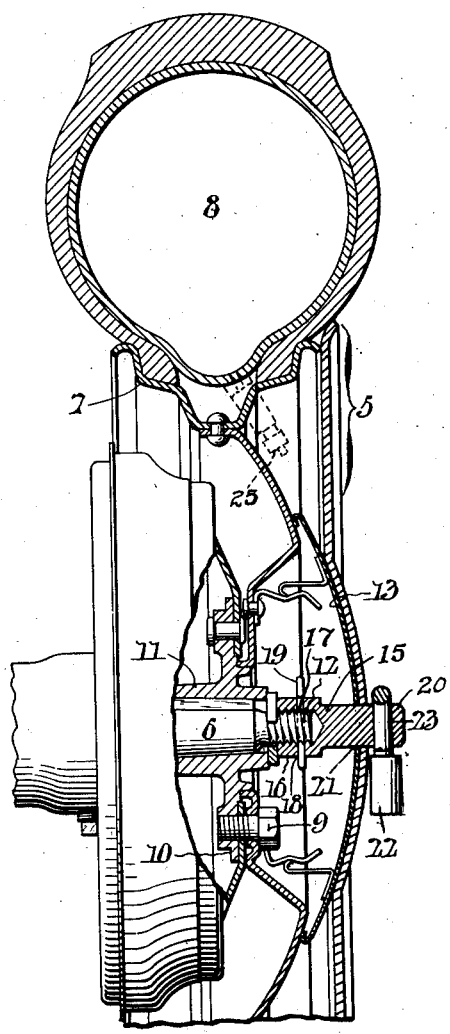
FIG_1_
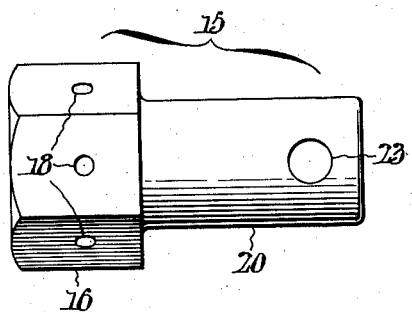
FIG_2_
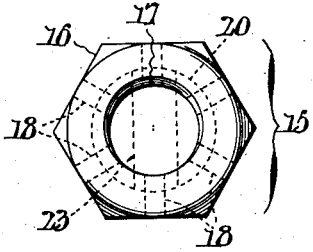
FIG_3_
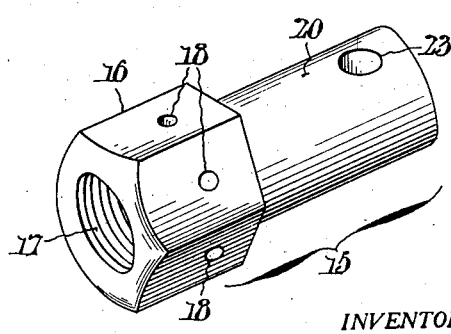
FIG_4_
WITNESSES:
Thomas W. Kerr, Jr
Hubert Fuchs
INVENTOR:
Ralph M. Shaw, Jr.,
BY Paul & Paul
ATTORNEYS.

Aug. 31, 1943. R. M. SHAW, JR 2,328,301
WHEEL THEFT PREVENTION MEANS
Filed April 21, 1942 2 Sheets-Sheet 2

WITNESSES:
Thomas W. Kerr, Jr.
Hubert Fuchs

INVENTOR:
Ralph M. Shaw, Jr.,
BY Paul & Paul
ATTORNEYS.

Patented Aug. 31, 1943

2,328,301

UNITED STATES PATENT OFFICE 2,328,301

WHEEL THEFT PREVENTION MEANS

Ralph M. Shaw, Jr., Edgewater Park, N. J.

Application April 21, 1942, Serial No. 439,852

6 Claims. (Cl. 70—259)

This invention relates to means for preventing the theft of automobile tires and the like. More particularly it has reference to theft prevention means for automobile wheels of the type having hub covers which close axial cavities in the wheels and which are removable for convenience of access to the securing bolts and/or nuts.

Due to the acute rubber shortage at the present time, tire thieving has become quite common and has reached a serious stage, notwithstanding the infliction of heavy penalties upon detection. Since it is easier and quicker to remove the wheels as a whole than to dismount the tires from the wheel rims, the thieves have in most instances resorted to that method of obtaining the tires.

My invention has for its chief aim to frustrate the tire theft method just referred to by making impossible the illicit removal of wheels. This objective I realize in practice as hereinafter more fully disclosed, through provision of a simple and inexpensive theft prevention means including an element which is securable within the axial hollow of the wheel and which has a stud extension for projection through an aperture in the wheel hub cap or cover; and a lock device which is detachably engageable with the protruding end of said element.

Another aim of my invention is to preclude illicit access to the tire valve stem and thereby prevent tire deflation. This objective I likewise realize in practice as also hereinafter more fully set forth through provision of an auxiliary disk which reaches from the hub to the wheel felly and which is securable with or in lieu of the usual hub cover by the aforementioned lock device.

Other objects and attendant advantages will appear from the following detailed description of the attached drawings, wherein Fig. 1 is a fragmentary view partly in elevation and partly in section of one of the rear wheels of an automobile with incorporated theft prevention means conveniently embodying my invention.

Fig. 2 is a side elevation of the element aforementioned which constitutes a part of the theft prevention means.

Fig. 3 is an end elevation of the element as it appears when viewed from the left of Fig. 2.

Fig. 4 is a perspective view of said element.

Figure 5:
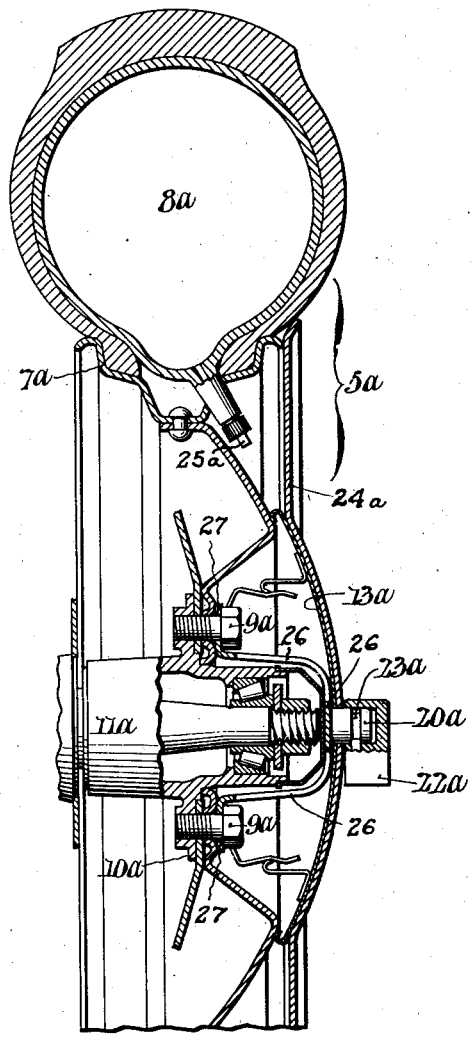
Fig. 5 is a fragmentary view like Fig. 1 showing an alternative embodiment of my invention.

With more detailed reference first more particularly to Fig. 1, the numeral 5 comprehensively designates a typical modern automobile wheel which is keyed to the shaft 6 and which provides a circumferential channel 7 for the mounting and retainment of a pneumatic tire 8. At 9 is shown one of the bolts whereby the wheel 5 is detachably secured to the circumferential fin or flange 10 of the wheel hub member 11, the outer end of the axle 6 being reduced and threaded at 12 for the usual end nut (not shown) by which said hub member is retained. As ordinarily the wheel-securing bolts 9 within the axial hollow of the wheel are accessible upon removal of the hub cap or cover designated 13.

In the embodiment illustrated in Figs. 1-4, the theft prevention means of my invention includes an element in the form of a stud which is comprehensively designated by the numeral 15 and which is delineated in perspective in Fig. 4. As shown, the element 15 is formed at one end with a polygonal head 16 and at that end is internally threaded as at 17 to engage the screw end 12 of the wheel axle in place of the usual axle nut. As further shown, the headed end 16 of the element 15 is provided with a plurality of diametral apertures 18 which are intended to be selectively used for passage of the usual nut locking cotter-pin 19 (Fig. 1). The outer or shank end 20 of the element 15 is preferably made cylindric and is of a length to extend through a central opening 21 in the cover 13 with protrusion therebeyond to the extent shown in Fig. 1. The theft prevention means of my invention also includes a lock device for application to the protruding end of the element 15, said device being herein represented as having the form of a padlock 22 with its hasp passed through a diametral hole 23 in the outer end of said element. As further shown, I have also provided a supplemental cover disk 24 which is centrally apertured to clear the end of the stud element 15 in being placed over the cover 13, and which closes against the rim of the wheel at the outside of the latter, being held in the assembly by the lock device 22.

Thus through the above described simple provisions, the hub cap or cover of the wheel is effectively locked against illicit removal, and the wheel-securing and axle nuts as well as the tire valve 25 thereby rendered inaccessible. In the case of rear wheels the elements 15 and the lock devices 22 will of course revolve with the wheels; while those employed with front wheels will remain at rest with the wheel axles.

Figure 6:
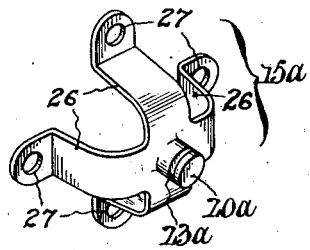
Fig. 6 is a perspective view of one of the alternative parts.

The form of my invention illustrated in Figs. 5 and 6 is intended for use in instances where a grease retaining cup is mounted on the axle end and where the use of the stud element shown in Figs. 1-4 would not be feasible. In order to meet conditions of this sort, I provide a spider 15a having outwardly bowed radial arms 26 which are pierced at their ends as at 27 for passage of the shanks of the wheel securing bolts 9a, and having a stud projection 20a at the center for protrusion through the axial opening in the hub cover 13a. In the modification, the stud projection has a circumferential groove 23a, and a lock 22a of a suitable type for engaging said groove. It is to be understood that the number of spider arms of the element 15a may be varied in practice in accordance with the number of securing bolts used in wheels of different makes or types.

As in the first described embodiment, I have shown in Fig. 5 an auxiliary disk 24a which covers the entire wheel at the outside and precludes access to the tire valve 25a and in turn unauthorized deflation of the tire, thereby adding to the effectiveness of my invention as a theft prevention means. The auxiliary cover disk 24a, it will be here also observed, is axially apertured to engage over the stud projection so as to be securable against illicit removal by the lock device 22a which serves the usual hub cover 13a. If desired, the usual hub cover may be eliminated altogether in instances where the auxiliary cover disk is used. The stud of the first described embodiment may be grooved at its outer end for use of a lock such as illustrated in Fig. 5.

The locks 22 and 22a are of course to be considered as exemplary of other types of commercially available lock devices which, within the scope of the appended claims, may be employed if found convenient or desirable in practice.

Having thus described my invention, I claim:

1. Means for preventing theft of automobile wheels of the type having an axial cavity and a hub cover therefor which is removable for access to wheel-securing bolts within said cavity, said means comprising an element which is securable within the hollow of the wheel hub structure and which has a stud projection for protrusion through an opening in the hub cover; a lock device engageable with the protruding end of said projection beyond the hub cover; and an auxiliary disk adapted for placement over the hub cover and extending to the felly of the wheel to prevent access to the valve of the tire associated with the wheel, said auxiliary disk being apertured to engage over the stud projection and being held in place by the said lock device.

2. Means for preventing theft of automobile wheels of the type having an axial cavity and a hub cover therefor which is removable for access to wheel-securing bolts within said cavity, said means comprising an element securable within the hollow of the wheel hub structure and provided with an outward stud projection; a cover disk adapted to overlie the hub cover and extending to the felly of the wheel to prevent access to the valve of the tire associated with the wheel, said hub cover and disk having axial apertures for protrusion therethrough of the stud projection; and a lock device engageable with the protruding end of said projection beyond said disk.

3. Means for preventing theft of demountable automobile wheels of the dished discous type with an outwardly-projecting flanged felly rim through which the tire valve extends inwardly, and with a frontally-open hub cavity by way of which access may be had to the wheel securing bolts within said cavity, said means including a stud element which is securable within the hollow of the wheel hub; a cover member in the form of a solid auxiliary disc which extends to the outer felly flange of the wheel to close the open front of said wheel and thus prevent unauthorized access to the tire valve, and which has an aperture for protrusion therethrough of the outer end of the stud element; and a lock device engageable with the protruding end of said stud element outwardly beyond the cover member.

4. The invention according to claim 3, in which the wheel revolves about an axle; and in which the stud element is internaly threaded at its inner end for screw engagement with the outer end of the wheel axle.

5. The invention according to claim 3, in which the stud element is secured with the wheel by the wheel securing bolts.

6. The invention according to claim 3, in which the stud element is in the form of a spider with outwardly bowed legs which are pierced at their ends for passage of the shanks of the wheel securing bolts.

RALPH M. SHAW, Jr.